United States Patent
Lardy et al.

(10) Patent No.: US 8,580,002 B2
(45) Date of Patent: Nov. 12, 2013

(54) MULTISTAGE SEPARATION SYSTEM

(75) Inventors: Pascal Lardy, Houston, TX (US); H. Allan Kidd, Shinglehouse, PA (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 203 days.

(21) Appl. No.: 13/171,259

(22) Filed: Jun. 28, 2011

(65) Prior Publication Data

US 2012/0005996 A1  Jan. 12, 2012

Related U.S. Application Data (60) Provisional application No. 61/362,842, filed on Jul. 9, 2010.

(51) Int. Cl.
*B01D 45/12* (2006.01)

(52) U.S. Cl.
USPC .................. 55/317; 55/318; 55/401; 55/406; 55/447

(58) Field of Classification Search
CPC ..................................................... B01D 45/00
USPC ........... 55/317–337, 383, 392–399, 438, 447, 55/466–473; 96/155, 188, 189, 204, 96/206–220
See application file for complete search history.

(56) References Cited

U.S. PATENT DOCUMENTS

| | | | | |
|---|---|---|---|---|
| 4,725,196 A | * | 2/1988 | Kaneki et al. | 415/98 |
| 4,877,431 A | * | 10/1989 | Avondoglio | 55/321 |
| 5,222,693 A | * | 6/1993 | Slutzkin et al. | 244/53 B |
| 2003/0029318 A1 | * | 2/2003 | Firey | 95/267 |
| 2009/0304496 A1 | * | 12/2009 | Maier | 415/121.2 |
| 2010/0162889 A1 | * | 7/2010 | Cornet et al. | 95/157 |

FOREIGN PATENT DOCUMENTS

WO   WO2008/036394   *   3/2008   ............... 210/380.3

* cited by examiner

*Primary Examiner* — Duane Smith
*Assistant Examiner* — Sonji Turner
(74) *Attorney, Agent, or Firm* — Edmonds & Nolte, PC (57) ABSTRACT

A "bolt on" static separator is disclosed for use in conjunction with a rotating separator to handle higher liquid volumes that are not able to be effectively separated by the rotating separator alone. The static separator may be positioned upstream of the rotating separator, generally right in front of the rotating separator, i.e., immediately ahead of the inlet to the rotating separator and generally attached directly to the front end of the rotary separator. The static separator may include a significant change in flow path direction that is sufficient to cause coarse fluid separation. The output of the static separator is in communication with the input of the rotating separator. Additionally, the drain of the static separator is in communication with the drain of the rotating separator and is at the same pressure.

17 Claims, 5 Drawing Sheets

FIG. 6 though it does not in itself dictate a relationship between the

MULTISTAGE SEPARATION SYSTEM

CROSS-REFERENCE TO RELATED APPLICATIONS

This application claims priority to U.S. Provisional Patent Application having Ser. No. 61/362,842, which was filed Jul. 9, 2010. The entirety of this priority application is incorporated herein by reference to the extent consistent with the present disclosure.

BACKGROUND

In compression systems, a multiphase fluid stream is typically separated into gas and liquid phases prior to compression, as compressors suitable for a gaseous compression are oftentimes not configured to effectively process the liquid portion of a multiphase fluid stream. As such, a fluid separation system configured to remove the liquid portion of the multiphase fluid stream is generally positioned upstream of the compression system, such that the inlet stream to the compression system is substantially free of fluids. A typical fluid separation system used in this scenario includes a rotating drum-type system that uses a rotating drum to generate sufficient force to physically cause the fluid portion of the multiphase stream to be separated from the gas portion of the stream. However, in many compression systems, the multiphase fluid arrives at an inlet of the rotary separator containing a higher volume or percentage of fluid than the rotary separator is capable of separating. As such, a larger rotary separation system is required, which substantially increases the complexity and cost (initial equipment and ongoing maintenance) of the system.

As such, there is a need for a simple, efficient, and cost effective solution to allow smaller and less expensive rotary separators to effectively handle higher volume liquid separation.

SUMMARY

Embodiments of the disclosure may provide a "bolt on" static separator that is used in conjunction with a rotating separator to handle higher liquid volumes that are not able to be effectively separated by the rotating separator alone. The static separator may be positioned upstream of the rotating separator, generally right in front of the rotating separator, i.e., immediately ahead of the inlet to the rotating separator and generally attached directly to the front end of the rotary separator. The static separator may include a significant change in flow path direction that is sufficient to cause coarse fluid separation. The output of the static separator is in communication with the input of the rotating separator. Additionally, the drain of the static separator is in communication with the drain of the rotating separator and is at the same pressure.

In another embodiment of the disclosure, a multistage separation system is provided. The system may include a rotating shaft driving a multistage compressor, a rotating fluid separation system attached to the rotating shaft with an output of the rotating fluid separation system communicating with an input of the multistage compressor, and a static separation curve positioned upstream of the fluid separation system such that an output of the separation curve feeds an inlet of the fluid separation system, the separation curve being at least partially positioned radially outward of the fluid separation system.

Another embodiment of the disclosure may provide a combined static and dynamic separation system. The system may include a driven centrifugal compressor having a central rotating shaft, a rotating separation section comprising a rotating fluid separation drum attached to the rotating shaft for concomitant rotation therewith, and a static separation section positioned immediately upstream of the rotating separation section such that an output of the static separation section is in fluid communication with an input to the rotating separation section, a static separation fluid drain configured to capture fluid separated by the static separation section, and a rotating separation section fluid drain configured to capture fluid separated by the rotating fluid separation section, wherein the static separation fluid drain and the rotating separation fluid drain are at the same pressure.

One embodiment of the disclosure includes a combined compressor and two-stage fluid separation system. The system includes a centrifugal compressor attached to a driven shaft, a rotating separation section attached to the driven shaft and configured to rotate therewith, an output of the rotating separation section being in fluid communication with an input of the centrifugal compressor, a static separation section positioned longitudinally along an axis of the driven shaft, an input of the static separation section being positioned to receive a gas stream and direct the gas stream around a static separation turn positioned radially outward of the rotating separation section and including a separation turn of between about 150° and 190°, and a rotating separation section fluid drain and a static separation section fluid drain, both drains being contained in a single pressure vessel and being at the same pressure.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
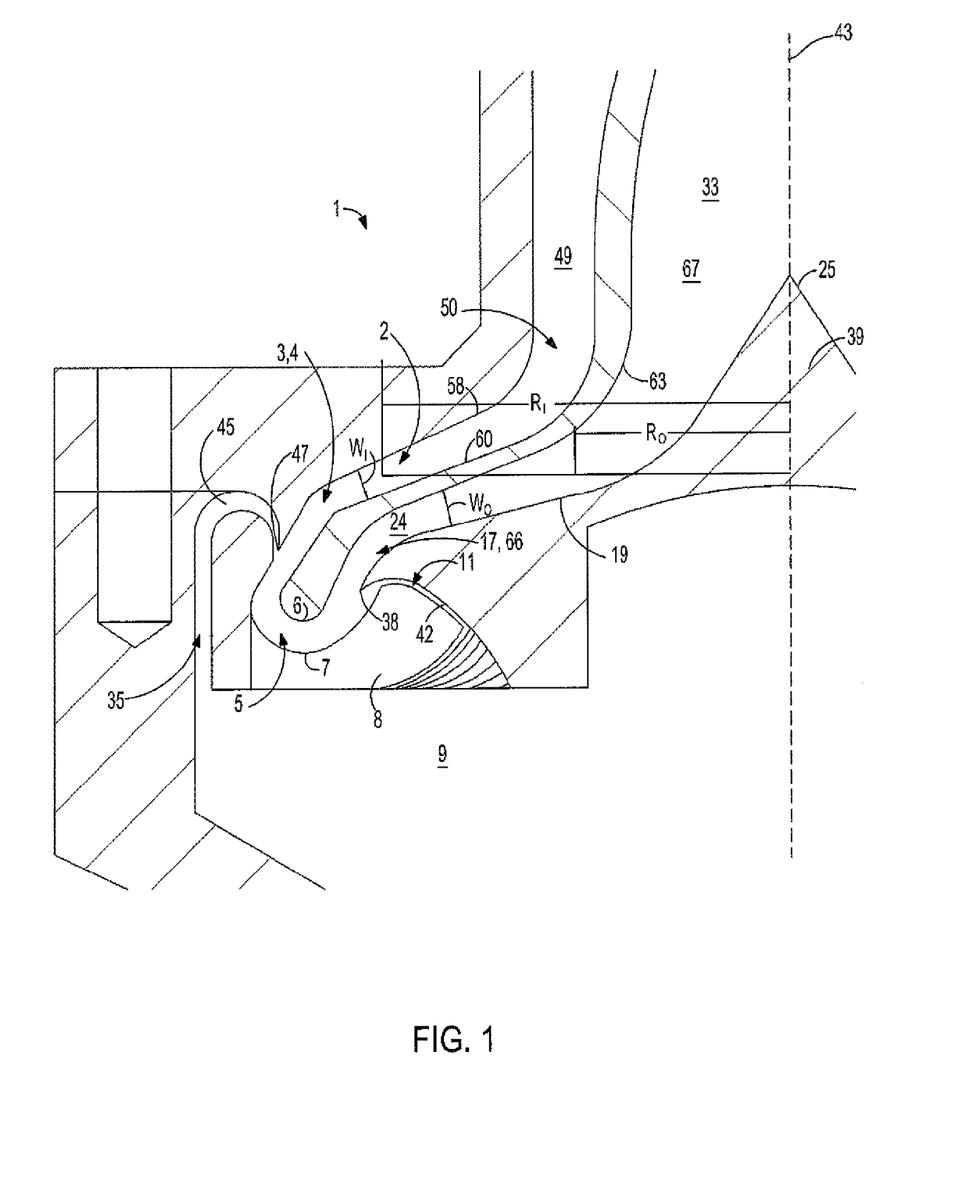
FIG. 1 illustrates a partial, sectional view of an exemplary static separator assembly of the present disclosure.

FIG. 1 illustrates an exemplary static separator 1 that may be used in the combination static and rotary separation system of the present disclosure. An inlet duct 2 to the static separation system 1 has a fluid entrance 50 that is connected to an inlet pipe 49 and an inlet fluid exit 3 that is connected to a separating turn 5. Further, the inlet duct 2 has an outer wall 58 and an inner wall 60, which are spaced apart. The distance between the outer and inner walls 58, 60 defines an inlet width $W_I$. At any given horizontal cross-section, the inlet duct 2 further defines an inlet radius $R_I$, with the inlet radius $R_I$ being the distance from a centerline 43 of the static separator 1 to the center of the inlet duct 2. As illustrated, the inlet width $W_I$ decreases from a maximum at the inlet fluid entrance 50 to a minimum at the inlet fluid exit 3. Further, the inlet radius $R_I$ may vary inversely with the inlet width $W_I$, such that the inlet radius $R_I$ increases as the inlet width $W_I$ decreases. The inlet radius $R_I$ has a maximum inlet radius $R_I$ at the inlet fluid exit 3 and a minimum inlet radius $R_I$ at the inlet fluid entrance 50. Accordingly, the cross-sectional area through which a fluid may flow, i.e., the flow area, of the inlet duct 2 at any given horizontal cross-section will generally remain substantially constant. Further, the inlet duct 2 may extend at an angle □ until the inlet radius $R_I$ reaches a desired length, which may be, for example, three times the nominal radius of the inlet pipe 49, at which point the inlet fluid exit 3 of the inlet duct 2 may be connected to the separating turn 5.

The separating turn 5 is fluidly connected to the inlet duct 2 at an inlet end 4, and has a gas outlet end 17 that is connected to the outlet fluid entrance 66 of the outlet duct 24. Between the inlet end 4 and the gas outlet end 17, the separating turn 5 includes an inner surface 6 and an outer surface 7, with an outer body 8 of the separator 1 providing the outer surface 7. A gas return channel 45 may be formed around the outside of the separating turn 5, such that the separating turn 5 is generally disposed between the gas return channel 45 and the centerline 43. The gas return channel 45 may include a passageway 35, which may be at least partially toroidal around the outside of the separating turn 5, and may terminate at an injection interface 47, which is fluidly connected to the separating turn 5, proximate the inlet end 4. In an exemplary embodiment, the gas return channel 45 fluidly connects a liquid outlet 9 to the separating turn 5, and the injection interface 47 may be a convergent nozzle or an ejector, to aid in redirecting of an outflow of gas, as described below.

The separating turn 5 may further include an auxiliary liquid outlet channel 11, which may include a lip 38 extending from the outer surface 7 toward the inner surface 6 and located proximate the gas outlet end 17 of the separating turn 5. The auxiliary liquid outlet channel 11 may also include a liquid passageway 42, which may extend, for example, through the outer body 8 to the liquid outlet 9, thereby fluidly connecting the lip 38 with the liquid outlet 9.

The gas outlet end 17 of the separating turn 5 may be connected to the outlet fluid entrance 66 of the outlet duct 24. In an exemplary embodiment, the outlet duct 24 may be formed similarly to the inlet duct 2. Accordingly, the outlet duct 24 may have an outlet fluid exit 67 connected to an outlet pipe 33, and an interior wall 19. The interior wall 19 may be defined by a radial flow expander 39, which may form a flow expander peak 25, where a flow of fluid through the outlet duct 24 flows out into the outlet pipe 33, thereby changing from a flow path with a ring-shaped cross-section to one with a circular cross-section. In another exemplary embodiment, the inlet duct 2 is inside the outlet duct 24, the radial flow expander 39 may be formed in the inlet duct 2, such that it defines the inner wall 60 of the inlet duct 2. In such an embodiment, the flow expander peak 25 may form the beginning of the change in the shape of the cross-section of the fluid flow from circular in the inlet pipe 49 to ring-shaped in the inlet duct 2.

The interior wall 19 may be spaced apart from an exterior wall 63 of the outlet duct 24 to define an outlet duct width $W_O$. The outlet duct width $W_O$ may increase from a minimum outlet duct width $W_O$ at the outlet fluid entrance 66, to a maximum outlet width $W_O$ at the outlet fluid exit 67. Additionally, the distance from the centerline 43 to the middle of the outlet duct 24 may define an outlet duct radius $R_O$. In an exemplary embodiment, the outlet duct radius $R_O$ may decrease from the outlet fluid entrance 66 to the outlet fluid exit 67 in inverse proportion to the increasing outlet width $W_O$, such that the horizontal cross-section of the flow area of the outlet duct 24 remains substantially constant throughout.

Applicants note that an exemplary static separator is shown in commonly-assigned U.S. Patent Application having Publication No. 2011/0061536, entitled Improved Density-Based Compact Separator, the contents of which are hereby incorporated by reference into the present application, to the extent that the incorporated application is consistent with the present disclosure.

Figure 2:
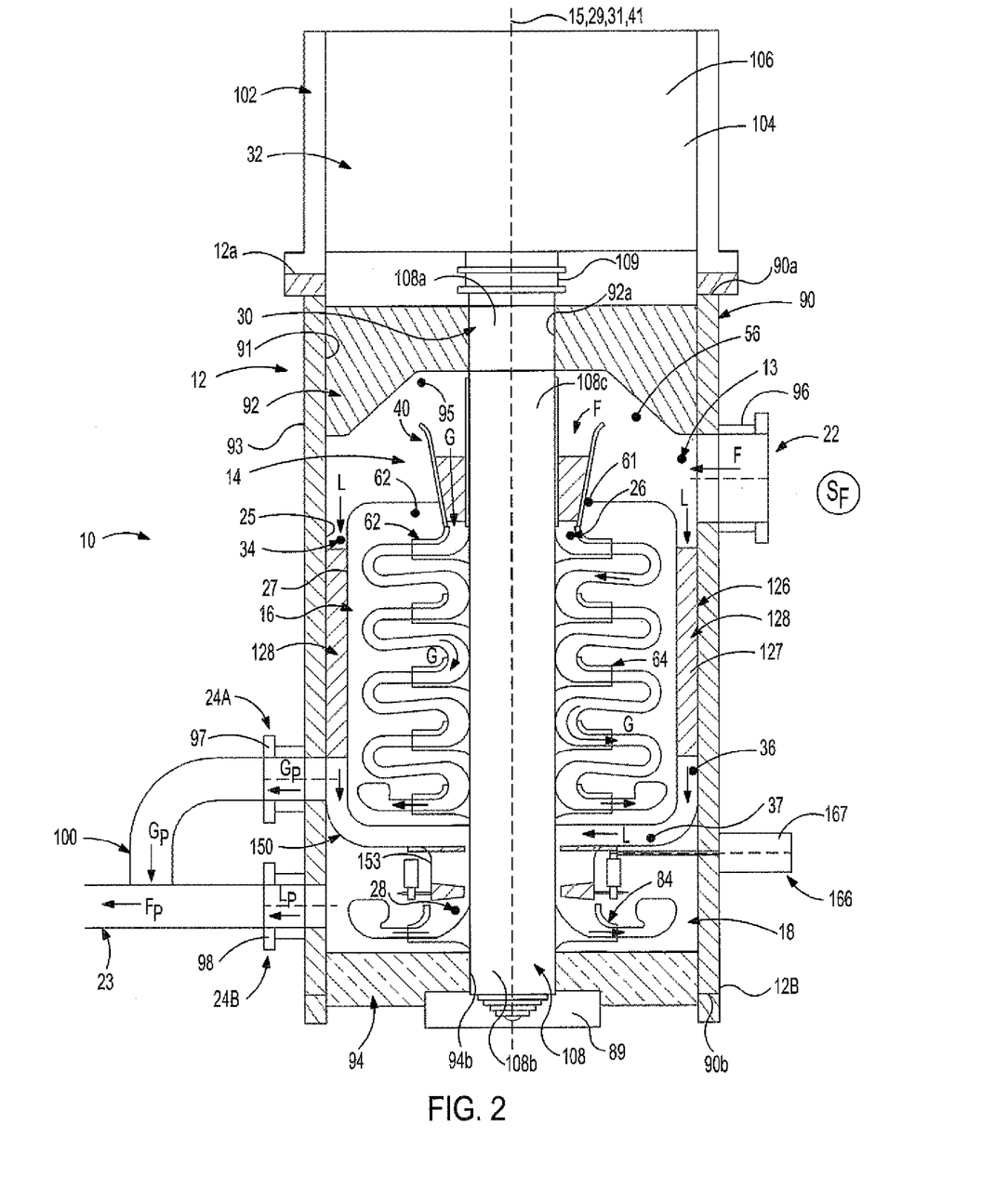
FIG. 2 illustrates a sectional view of an exemplary ICS system of the present disclosure.
Figure 3:
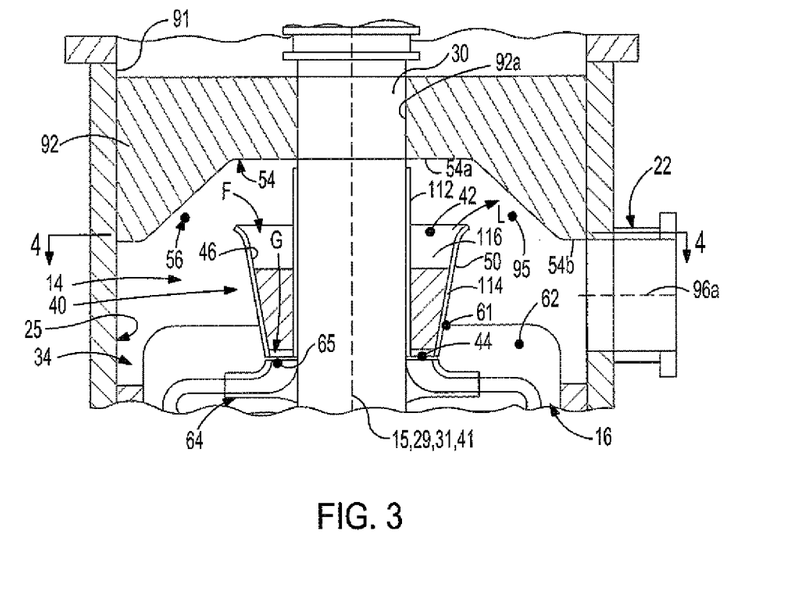
FIG. 3 illustrates a sectional view of the exemplary rotary separation portion of the exemplary ICS system illustrated in FIG. 2.
Figure 4:
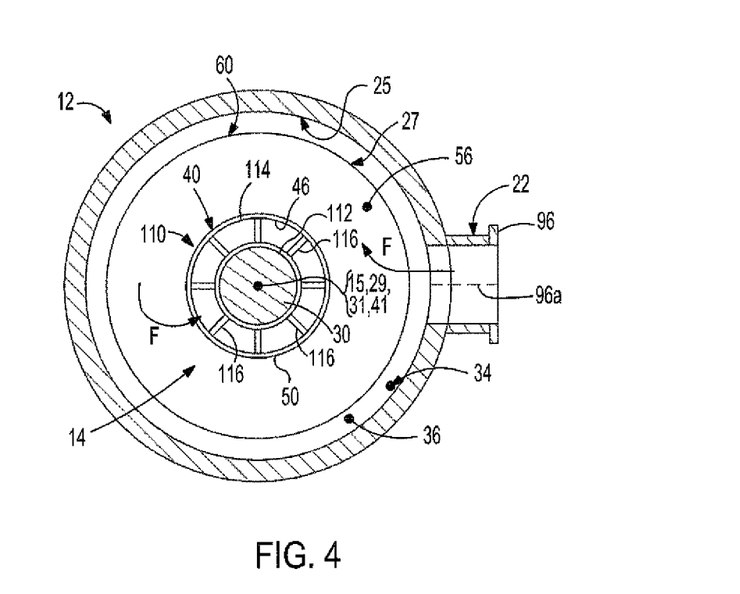
FIG. 4 illustrates an end sectional view of the exemplary rotary separation portion of the exemplary ICS system illustrated in FIG. 2.

FIG. 2 illustrates an exemplary rotary separator and compressor combination, which may be generally referred to as an integrated compression system or ICS. The exemplary ICS system briefly described herein is further detailed in commonly-owned U.S. Patent Application having Ser. No. 60/778,688 and PCT Patent Application having Serial No. PCT/US2007/005489, entitled Multiphase Processing Device, which was first filed on Mar. 3, 2006; the contents of this commonly-owned application are hereby incorporated by reference into the present application, to the extent that the incorporated subject matter is consistent with the present disclosure. Additionally, FIG. 3 illustrates a sectional view of the exemplary rotary separation portion of the exemplary ICS system illustrated in FIG. 2, and FIG. 4 illustrates an end sectional view of the exemplary rotary separation portion of the exemplary ICS system illustrated in FIG. 2. Both of these figures are from the prior application that is incorporated by reference, and as such, further description of the specifics of these figures is found in the incorporated application.

The exemplary ICS system 10 is configured to process a multiphase fluid stream F that includes a mixture of a gas G and a liquid L, and generally includes a housing 12 having an interior chamber 13, a rotating separator 14, a multistage compressor 16, and a pump 18 (optional) or a liquid collector (not shown), each of which are generally disposed within the same housing or chamber 13. The housing 12 has an inlet 22 fluidly connected with the interior chamber 13 and fluidly connectable with a source multiphase stream $S_F$, and first and second outlets 24A, 24B.

The rotating separator 14 of the ICS system 10 is fluidly coupled with the housing inlet 22, such that the fluid stream F flows generally to the rotating separator 14. The rotating separator 14 is configured to separate the fluid stream F into a substantially gaseous portion G and a substantially liquid portion L. The compressor 16 is fluidly coupled with the rotating separator 14 such that the substantially gaseous portion G output from the rotating separator 14 flows into the compressor 16 for compression before being discharged from the compressor at an outlet 24A.

Further, the optional pump 18 has an inlet 28 fluidly coupled with the rotating separator 14, and is preferably spaced therefrom, such that the stream liquid portion L flows at least partially by gravity or centrifugal force from the rotating separator 14 to the pump inlet 28. However, the separator 14 and/or pump 18 may be configured such that the substantially liquid portion L flows substantially by suction generated by the pump 18, particularly when the rotating separator 14 and the pump 18 are horizontally-spaced, or in any other appropriate manner. The pump 18 is configured to pressurize the liquid portion L of the flow stream F and to discharge the pressurized liquid portion L through the housing second or "liquid" outlet 24B. The ICS system 10 may instead have a liquid collector (not shown) disposed generally beneath or otherwise proximate the compressor 16 and fluidly coupled with the rotating separator 14 and with the housing second outlet 24B, the collector 20 having a chamber 21 configured to contain a quantity or "accumulated volume" of the liquid portions L.

The ICS system 10 also generally includes a drive shaft 30 extending generally through the housing chamber 13 and being rotatable about a central axis 31. Each one of the rotating separator 14, the compressor 16, and the optional pump 18 having at least one rotatable member 40, 64, and 84, respectively, connected with the shaft 30 and spaced apart vertically along the central axis 31. As such, rotation of the drive shaft 30 about the axis 31 generally operates each one of the separator 14, the compressor 16 and the pump 18. The ICS system 10 may further include a drive motor (not shown) connected with the shaft 30 and configured to rotate the shaft 30 about the central axis 31, the motor generally being mounted to one end 12a or 12b of the housing 13.

The rotating separator 14 is configured to direct liquid extracted from the fluid stream radially-outwardly toward a housing inner surface 25, such that liquid portions L flow into a liquid flow channel 34 and thereafter flow at least partially by gravity or other fluid driving force to the optional pump inlet 28. As illustrated in FIGS. 3-6, the rotating separator 14 may include a body 40 rotatable about a central axis 41, the separator body 40 having a first and second end 40a, 40b, respectively. The first or "upper" body end 40a has a first or "stream inlet" opening 42 fluidly coupled with the housing inlet 22 so as to receive the fluid stream F, and the second or "lower" body end 40b has a second or "gas outlet" opening 44 fluidly coupled with the compressor 16. An inner separation surface 46 extends circumferentially about the axis 41 and generally between the body first and second ends 40a, 40b. Further, the separation surface 46 defines a separation chamber 48 and is angled radially-outward toward the body first end 40a. With this structure, as the separator body 40 rotates about the axis 41, liquid portions L of the fluid stream F contact the inner separation surface 46 are directed away from the body axis 41 and toward, and beyond, the body first end 40a. In other words, centrifugal force generated by rotation of the separator 14 causes the relatively-heavier, liquid portions L (compared to the gas portion) contacting the rotating inner separation surface 46 to move upwardly and outwardly the along the angled inner surface 46 until the liquid portions are projected or "slung" from the body upper end 40a in a spiral path toward the housing inner surface 25. As such, the liquid portions L are directed to flow back out through the body first opening 42 while a remainder of the fluid stream F, i.e., the substantially gaseous portions G, flows in the downward direction d2 through the body second opening 44, and thereafter into the compressor 16.

The separator 14 may further include an outer separation surface 50 extending circumferentially about the body axis 41 and generally between the body first and second ends 40a, 40b. As with the inner surface 46, the outer separation surface 50 is angled radially-outward in the direction toward the body first end 40a. As such, as the separator body 40 rotates about the axis 41, liquid portions L of the fluid stream F contacting the outer separation surface 50 are directed generally radially outward away from the body axis 41 and generally axially toward the body first end 40 so as to be directed generally toward the housing inner surface 25. In other words, centrifugal forces cause the relatively heavier liquid portions L contacting the rotating outer separation surface 50 to slide or move upwardly and outwardly the along angled outer separation surface 50 until being projected/slung from the separator body upper end 40a in a generally spiral path toward the housing inner surface 25.

With the basic structure described above, operation of the ICS system 10 of the present disclosure may be appreciated. A multiphase fluid stream F enters the housing 12 through the housing inlet 22 and flows into a plenum chamber 56, swirls about and flows into the rotating separator 14. Liquid portions L are separated from the remaining, substantially gaseous portions G of the fluid stream F, and are directed into the liquid flow passage 34. Generally simultaneously, the gaseous portions G flow into the compressor inlet 26 and are pressurized or compressed such that the gas pressure is incrementally increased as the gas portions G flow through each compressor stage 66. The pressurized gas portions Gp are discharged from the compressor 16 and flow out the housing through the housing gas outlet 24A.

The separated liquid portions L entering the liquid flow passage 34 flow by gravity (and suction) through a passage vertical portion 36, and thus around the compressor 16, and then through the passage horizontal portion 37 beneath the compressor 16 and into the optional pump inlet 28. The optional centrifugal pump 80 then pressurizes the liquid portions Lp as the portions Lp are accelerated radially outwardly by the impeller 84, and the pressurized liquid portions Lp flow out of the housing 12 through the liquid outlet 24B. The pressurized gas and liquid portions Gp, Lp may be merged or remixed in a common outlet pipe 23 connected with both of the housing outlets 24A, 24B, such that the pressurized fluid stream Fp is further processed or utilized, but the two pressurized flows Gp, Lp may alternatively remain distinct so as to be thereafter separately processed or utilized.

Applicants note that although the exemplary ICS 10 described herein is shown as a vertically oriented system, i.e., the common shaft 30 of the rotating separator 14 and compressor 16 is vertically oriented, the present disclosure is not limited to any particular orientation. As such, the present disclosure includes fluid separation and compression systems where the common shaft 30 is generally horizontally oriented. Other exemplary rotary separation systems include those disclosed in commonly-owned U.S. Provisional Patent Application Ser. No. 60/846,300 and the following Utility application Ser. No. 12/441,804; and commonly owned U.S. Provisional Patent Application Ser. No. 60/826,876 and the following Utility application Ser. No. 12/442,863. Each of the above noted commonly owned patent applications are incorporated by reference in their entirety into the present disclosure, to the extent that these prior disclosures are consistent with the present disclosure.

Figure 5:
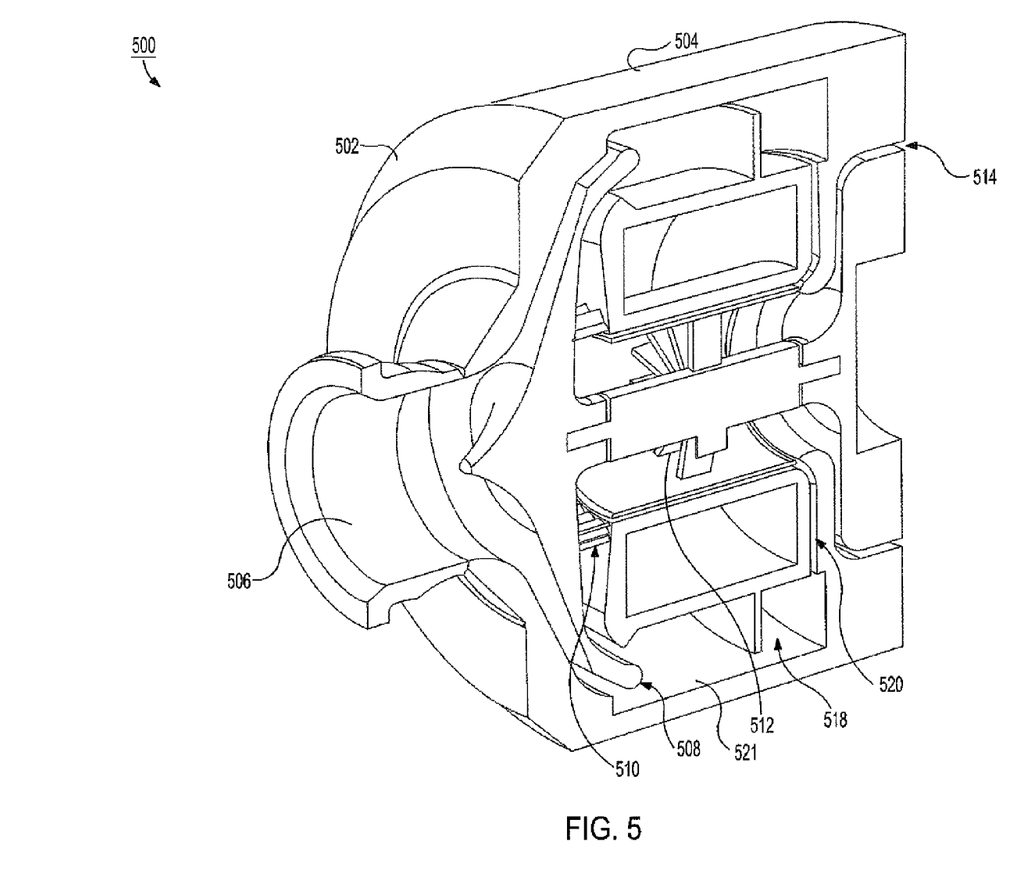
FIG. 5 illustrates perspective sectional view of an exemplary integrated static and rotary separator system of the disclosure.
Figure 6:
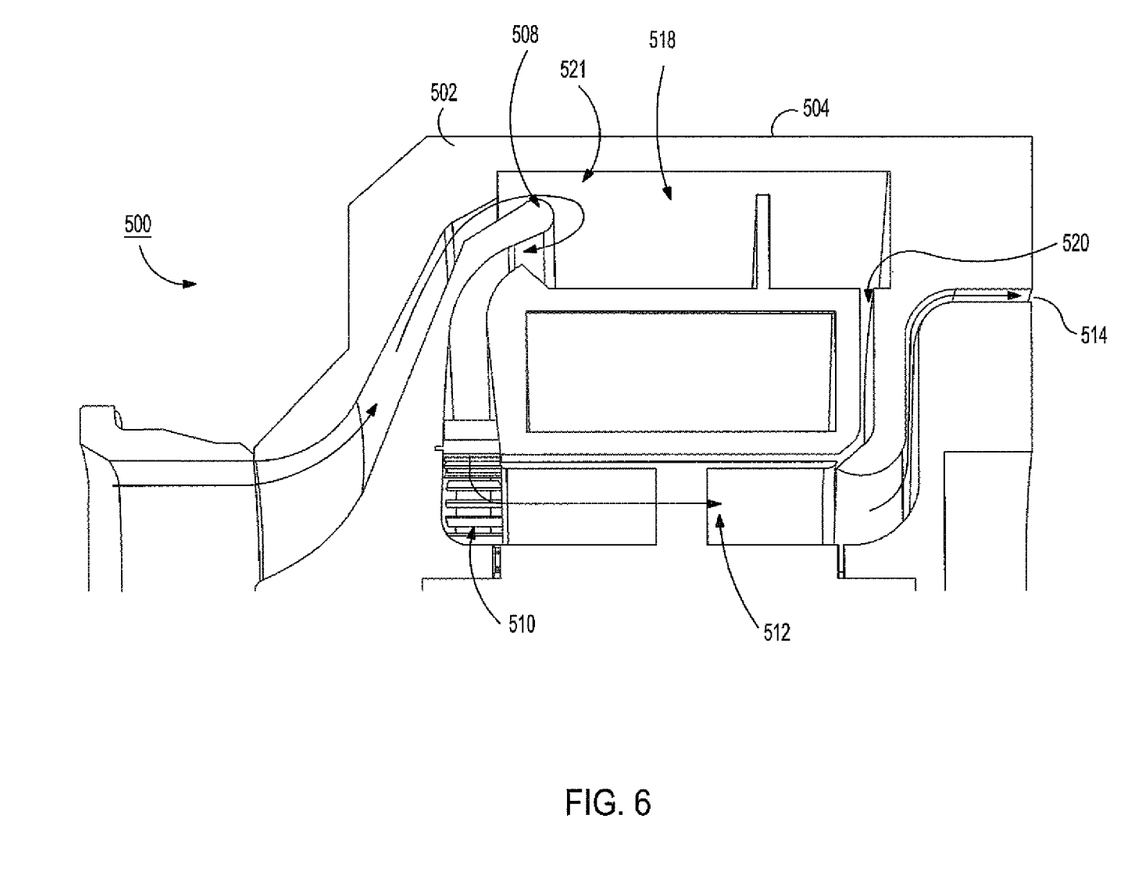
FIG. 6 illustrates sectional view of an exemplary integrated static and rotary separator system of the disclosure.

FIG. 5 illustrates perspective, sectional view of an exemplary integrated static and rotary separator system 500 of the disclosure, and FIG. 6 illustrates sectional view of an exemplary integrated static and rotary separator system 500 of the disclosure. The integrated separator 500 generally includes a static separation section 502 and a rotating separation section 504, with the static separation section 502 being bolted onto or otherwise attached to the front end of the rotating separation section 504. The attachment may include bolting the static separation section 502 directly to an inlet flange (not shown) of the rotating separation section. One advantage of attaching a static separator to the front end of a rotating separator is that the capacity of the rotating separator can be substantially increased. For example, by positioning a static separator upstream of a rotating separator, the static separator can function to coarse-separate fluids from the incoming gas stream, with coarse-separation including removing a portion of the fluid from the stream (generally the higher-density fluids are removed by the static separation). Thus, the gas stream entering the rotating separator has less liquid mass to separate, and as such, the rotating separator 504 is able to more efficiently separate the remaining liquids from the incoming (already coarse-separated) stream. The end result of adding a static separator to a rotating separator is a substantial increase in the separation efficiency, as the rotating separator does not get bogged down with coarse separation and is able to efficiently separate higher-density fluids from the incoming stream. Applicants note that the static separator may also be combined with the rotating separator 504 in a common casing (without the bolting or other attachment limitation).

The static section 502 of the integrated separator 500 includes an inlet 506 configured to receive the incoming fluid stream (containing, e.g., liquids and gases therein) for separation. The fluid stream enters the integrated separator 500 at the inlet 506 and is directed radially-outward (away from a central axis of the separator 500) toward a separation turn 508. The fluid stream is directed around the separation turn 508, as described with respect to FIG. 1, and as a result of the centrifugal force, coarse separation of liquids from the fluid stream is conducted. The coarse separation pulls heavier fluids outward toward the outer wall of the separation turn 508, while the less dense gas, which may contain some liquids therein, continues to travel radially-inward (toward the central axis of the separator 500) through a conduit that connects the separation turn 508 to an inlet 510 of the rotary separation section 504. The coarsely separated fluid that is separated by the turn 508 is collected in a static separation chamber 521 and may be drained or otherwise removed therefrom as desired.

The separation turn 508 may be structurally and functionally similar or the same as the separating turn 5 described above with respect to FIG. 1, and may include an annular fluid path having a high-velocity gas stream turn that includes at least a 130° flow patch direction change/turn that is configured to coarse-separate heavier liquids in the gas stream from the lighter gas portion of the stream. In one embodiment, the velocity (traveling speed of the gas through the associated conduit) of the fluid stream does not significantly decrease as the fluid stream travels around the separation turn 5. Thus the speed is maintained at a level sufficient to provide the centrifugal force necessary to coarse-separate liquids from the fluid stream as the fluid stream passes around the turn 5. The separating turn 5 may form any angle sufficient to generate the centrifugal force required to separate the liquids in the incoming fluid stream. In exemplary embodiments, the turning angle may be about 180°, between about 150 and 190°, between about 100° and about 130°, between about 125° and about 150°, or between about 100° and about 190°.

The fluid stream exiting the static separation section 502 is directed to the inlet 510 of the rotary separation section 504. The rotary separator 512, as detailed above with respect to FIGS. 2-4, generally spins the gas stream via a driven separation drum to separate the remaining fluids from the gas stream. The output 514 of the rotary separation section 504 may then be communicated to a compressor (e.g., compressor 16, above) for compression without significant liquid being contained in the gas to be compressed. Additionally, liquid separated from the fluid stream is expelled via a fluid drain 520 of the rotary separation section 504 and is collected in a rotary separation chamber 518, which is in fluid communication with the static separation chamber 521. As such, the fluid drained from the rotary separator section 504 is at the same pressure as the fluid drained from the static separation section 502. This provides a single pressure vessel configuration for the respective drains for the separation sections, which provides a substantial reduction in cost and maintenance.

Applicants contemplate that the static separator may be an aftermarket add-on to an existing rotary separator assembly to provide for additional separation capacity. In this embodiment, the stationary separator may be bolted or otherwise attached to the input side of the rotary separator and be used to pre-separate or coarse separate fluids from the incoming gas stream to increase the efficiency of the rotating separator. It should be noted that this increase in separation efficiency requires no input power, as the static separator is not shaft driven. Additionally, the static separator is generally configured to add minimal shaft or casing length to the overall apparatus, as the separation curve discussed above is radially outward from the shaft, and further, as shown in FIGS. 5 and 6, the separation curve includes an axial component, i.e., the gas stream is directed both radially outward and axially around the separation curve. Thus, the separation curve is generally at least partially positioned radially outward of the rotary separation drum, which adds minimal shaft or casing length to the overall separation assembly.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A multistage separation system, comprising:
   a rotating shaft driving a multistage compressor;
   a rotating fluid separation system attached to the rotating shaft, the rotating fluid separation system comprising:
      a radial inlet; and
      an output communicating with an input of the multistage compressor; and
   a static separation curve positioned upstream of the rotating fluid separation system such that an output of the separation curve feeds the radial inlet of the rotating fluid separation system, the separation curve being at least partially positioned radially outward of the rotating fluid separation system.

2. The multistage separation system of claim 1, wherein the multistage compressor and the rotating fluid separation system are configured to rotate at a same rotation speed on the shaft.

3. The multistage separation system of claim 1, wherein the static separation curve is positioned in a static separation housing, the static separation housing being attached to a front end of the rotating fluid separation system.

4. The multistage separation system of claim 3, wherein the front end of the rotating fluid separation system includes the radial inlet to the rotating fluid separation system.

5. The multistage separation system of claim 4, wherein the static separation housing is bolted to an inlet flange on the front end of the rotating fluid separation system.

6. The multistage separation system of claim 1, wherein the static separation curve includes at least a 130° turn to coarse-separate fluids from gases.

7. The multistage separation system of claim 1, wherein a fluid drain outlet of the static separation curve is in fluid communication with a fluid drain outlet of the rotating separation section, the respective fluid drain outlets being at the same pressure.

8. A combined static and dynamic separation system, comprising:
   a driven centrifugal compressor having a central rotating shaft;
   a rotating separation section comprising a rotating fluid separation drum attached to the rotating shaft for concomitant rotation therewith;
   a static separation section positioned immediately upstream of the rotating separation section such that an output of the static separation section is in fluid communication with a radial inlet of the rotating separation section;
   a static separation fluid drain configured to capture fluid separated by the static separation section; and
   a rotating separation section fluid drain configured to capture fluid separated by the rotating fluid separation section, wherein the static separation fluid drain and the rotating separation fluid drain are at the same pressure.

9. The combined static and dynamic separation system of claim 8, wherein the static separation section comprises a separation curve having a turn angle of between about 100° and about 190°.

10. The combined static and dynamic separation system of claim 9, wherein the separation curve is positioned radially-outward of the rotating separation section.

11. The combined static and dynamic separation system of claim 10, wherein an inlet of the static separation section is positioned longitudinally along the rotating shaft from the radial inlet to the rotating separation section and at the same radial distance from the shaft as the rotating separation section.

12. The combined static and dynamic separation system of claim 11, wherein an inlet flange of the rotating separation section matches an inlet flange and an outlet flange of the static separation section, to allow the static separation section to be bolted directly on to the rotating separation section.

13. The combined static and dynamic separation system of claim 12, wherein the static separation fluid drain and the rotating separation fluid drain are contained in a same pressure vessel.

14. The combined static and dynamic separation system of claim 13, wherein the turning angle is between about 150° and 190°.

15. The combined static and dynamic separation system of claim 14, wherein a fluid path leading to the separation curve travels longitudinally toward the rotating separation section along the shaft and radially away from the shaft such that the separation curve is positioned radially outward of the rotating separation section.

16. The combined static and dynamic separation system of claim 15, wherein a fluid path leading away from the separation curve travels longitudinally away from the rotating separation section along the shaft and radially toward the rotating shaft to connect with the radial inlet to the rotating separation section.

17. A combined compressor and two-stage fluid separation system, comprising:
   a centrifugal compressor attached to a drive shaft;
   a rotating separation section attached to the drive shaft and configured to rotate therewith, comprising:
      a radial inlet; and
      an output being in fluid communication with an input of the centrifugal compressor;
   a static separation section positioned longitudinally along an axis of the drive shaft, an input of the static separation section being positioned to receive a gas stream and direct the gas stream around a static separation turn positioned radially outward of the rotating separation section and into the radial inlet of the rotating separation section, the static separation turn being between about 150° and 190°; and
   a rotating separation section fluid drain and a static separation section fluid drain, both drains being contained in a single pressure vessel and being at the same pressure.

* * * * *